US012791783B2

(12) United States Patent
Enomoto

(10) Patent No.: US 12,791,783 B2
(45) Date of Patent: Nov. 10, 2026

(54) HOLLOW-CORE FIBER AND METHOD FOR MANUFACTURING HOLLOW-CORE FIBER

(71) Applicant: SUMITOMO ELECTRIC INDUSTRIES, LTD., Osaka (JP)

(72) Inventor: Tadashi Enomoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 272 days.

(21) Appl. No.: 18/835,066

(22) PCT Filed: Oct. 12, 2023

(86) PCT No.: PCT/JP2023/037065
§ 371 (c)(1),
(2) Date: Aug. 1, 2024

(87) PCT Pub. No.: WO2024/101065
PCT Pub. Date: May 16, 2024

(65) Prior Publication Data
US 2025/0164688 A1 May 22, 2025

(30) Foreign Application Priority Data
Nov. 11, 2022 (JP) ................................ 2022-181193

(51) Int. Cl.
*G02B 6/032* (2006.01)
*G02B 6/02* (2006.01)

(52) U.S. Cl.
CPC ......... *G02B 6/032* (2013.01); *G02B 6/02328* (2013.01); *G02B 6/02361* (2013.01)

(58) Field of Classification Search
CPC ................ G02B 6/023; G02B 6/02304; G02B 6/02309; G02B 6/02314; G02B 6/02328;
(Continued)

(56) References Cited

U.S. PATENT DOCUMENTS 7,292,761 B2 * 11/2007 Miyake .............. G02B 6/02347 385/39
7,327,922 B2 * 2/2008 Skovgaard ......... G02B 6/02357 385/125

(Continued)

FOREIGN PATENT DOCUMENTS

JP 2002-323625 A 11/2002
JP 2017-015881 A 1/2017

(Continued)

OTHER PUBLICATIONS

"Air-hole collapse and mode transitions in microstructured fiber photonic wires" by Magi et al., Optics Express, vol. 13, No. 2, pp. 453-459 (Year: 2005).*

(Continued)

*Primary Examiner* — Robert Tavlykaev
(74) *Attorney, Agent, or Firm* — McDonald Hopkins LLC

(57) ABSTRACT

A hollow-core fiber includes a hollow region that is a region extending in a longitudinal direction. The hollow region includes a glass structure constituting an optical transmission part provided with a hollow portion, and an outer cladding surrounding the glass structure. When a diameter of a circle having the same area as a total area of a cross section of the glass structure is set to 2a, an average refractive index of the glass structure is set to n1, an average refractive index of the outer cladding is set to n2, a wavelength of light propagating through the optical transmission part is set to λ, and a specific refractive index difference between the glass structure and the outer cladding is set to Δ shown in Equation (1), then n1>n2, and a normalized frequency v shown in Equation (2) is 2.56 or more.

(Continued)

[Formula 1]

$$\Delta = \frac{n1^2 - n2^2}{2n1^2} \quad (1)$$

[Formula 2]

$$v = \frac{2\pi}{\lambda} an1\sqrt{2\Delta} \quad (2)$$

15 Claims, 12 Drawing Sheets

(58) Field of Classification Search
CPC ............ G02B 6/02347; G02B 6/02352; G02B 6/02361; G02B 6/032
USPC ........................................................... 385/125
See application file for complete search history.

(56) References Cited

U.S. PATENT DOCUMENTS

| | | | | |
|---|---|---|---|---|
| 7,346,250 | B1 * | 3/2008 | Dabich, II | C03B 37/01228 385/115 |
| 7,483,615 | B2 * | 1/2009 | Mihailov | G02B 6/02376 385/125 |
| 7,496,260 | B2 * | 2/2009 | Dong | G02B 6/02366 385/125 |
| 7,660,504 | B2 * | 2/2010 | Beshears | G02B 6/02333 977/762 |
| 7,805,038 | B2 | 9/2010 | Williams et al. | |
| 8,285,099 | B2 | 10/2012 | Dong et al. | |
| 2002/0159734 | A1 * | 10/2002 | Sasaoka | G02B 6/02366 385/125 |
| 2004/0052484 | A1 * | 3/2004 | Broeng | G02B 6/02338 385/125 |
| 2005/0105867 | A1 | 5/2005 | Koch, III et al. | |
| 2006/0165361 | A1 * | 7/2006 | Hongo | G02B 6/032 385/125 |
| 2008/0138023 | A1 | 6/2008 | Williams et al. | |
| 2009/0052852 | A1 * | 2/2009 | Minkovich | G02B 6/02376 385/125 |
| 2011/0085769 | A1 | 4/2011 | Dong et al. | |
| 2013/0209046 | A1 | 8/2013 | Tanigawa et al. | |
| 2016/0002089 | A1 | 1/2016 | Matsuo et al. | |
| 2017/0008108 | A1 | 1/2017 | Wuerfel | |
| 2020/0115270 | A1 | 4/2020 | Yoo et al. | |
| 2021/0080644 | A1 | 3/2021 | Yoo et al. | |
| 2022/0234936 | A1 | 7/2022 | Rosenberger et al. | |
| 2023/0350135 | A1 | 11/2023 | Kamitsuna et al. | |

FOREIGN PATENT DOCUMENTS

| | | | |
|---|---|---|---|
| JP | 2017-052084 | A | 3/2017 |
| JP | 2022-502716 | A | 1/2022 |
| JP | 2022-530426 | A | 6/2022 |
| JP | 2022-541098 | A | 9/2022 |
| WO | 2004/001461 | A1 | 12/2003 |
| WO | 2009/044100 | A1 | 4/2009 |
| WO | 2020/070487 | A1 | 4/2020 |
| WO | 2020/217052 | A1 | 10/2020 |
| WO | 2022/044891 | A1 | 3/2022 |

OTHER PUBLICATIONS

Walter Belardi et al., "Hollow antiresonant fibers with reduced attenuation", Optics Letters, vol. 39, No. 7, Apr. 1, 2014, p. 1853-1856.
Jeff Hecht, "Is Nothing Better Than Something?", Optics & Photonics News, Mar. 2021, p. 28-34.
MD. Sarwar Hosen et al., "Single Polarization Low Loss Highly Birefringent Hollow-Core Antiresonant Fiber", 3rd International Conference on Electrical & Electronic Engineering (ICEEE), Dec. 22, 2021, p. 141-144.
Wei Ding et al., "Recent Progress in Low-Loss Hollow-Core Anti-Resonant Fibers and Their Applications", IEEE Journal of Selected Topics in Quantum Electronics, vol. 26, No. 4, Jul./Aug. 2020, p. 4400312-1-12.
Lieke D. Van Putten et al., "Optimizing the Curvature of Elliptical Cladding Elements to Reduce Leakage Loss in Antiresonant Hollow Core Fibres", 42nd European Conference and Exhibition on Optical Communications, Sep. 18, 2016, p. 1034-1036.
Dakun Wu et al., "Dependence of Waveguide Properties of Anti-Resonant Hollow-Core Fiber on Refractive Index of Cladding Material", Journal of Lightwave Technology, Nov. 1, 2019, vol. 37, No. 21, p. 5593-5599.

* cited by examiner

HOLLOW-CORE FIBER AND METHOD FOR MANUFACTURING HOLLOW-CORE FIBER

TECHNICAL FIELD

The present disclosure relates to a hollow-core fiber and a method for manufacturing the hollow-core fiber. This application claims the priority right based on Japanese Patent Application No. 2022-181193 filed on Nov. 11, 2022, the entire contents of the Japanese patent application are incorporated herein by reference.

BACKGROUND ART

As a hollow-core fiber, for example, a photonic crystal hollow-core fiber and an anti-resonant hollow-core fiber have been known. In Patent Literature 1, the photonic crystal hollow-core fiber is disclosed. In each of Patent Literatures 2 and 3 and Non Patent Literatures 1 and 2, the anti-resonant hollow-core fiber is disclosed.

CITATION LIST

Patent Literature

Patent Literature 1: International Publication WO 2009/044100

Patent Literature 2: Japanese Unexamined Patent Publication No. 2017-52084

Patent Literature 3: International Publication WO 2020/217052

Non Patent Literature

Non Patent Literature 1: W. Belardi et al., "Hollow antiresonant fibers with reduced attenuation", OPTICS LETTERS, Vol. 39, No. 7, Apr. 1, 2014, p. 1853 to 1856

Non Patent Literature 2: Jeff Hecht, "Is Nothing Better Than Something?", OPTICS & PHOTONICS NEWS March 2021, p. 28 to 34

SUMMARY OF INVENTION

A hollow-core fiber according to the disclosure includes a hollow region that is a region extending in a longitudinal direction. The hollow region includes a glass structure constituting an optical transmission part provided with a hollow portion, and an outer cladding surrounding the glass structure. When a diameter of a circle having the same area as a total area of a cross section perpendicular to the longitudinal direction of the glass structure is set to 2a, an average refractive index of the glass structure is set to n1, an average refractive index of the outer cladding is set to n2, a wavelength of light propagating through the optical transmission part is set to λ, and a specific refractive index difference between the glass structure and the outer cladding is set to Δ shown in Equation (1), then n1>n2, and a normalized frequency v shown in Equation (2) is 2.56 or more.

[Formula 1]

$$\Delta = \frac{n1^2 - n2^2}{2n1^2} \tag{1}$$

-continued

[Formula 2]

$$v = \frac{2\pi}{\lambda} an1\sqrt{2\Delta} \tag{2}$$

DESCRIPTION OF EMBODIMENTS

Figure 1:
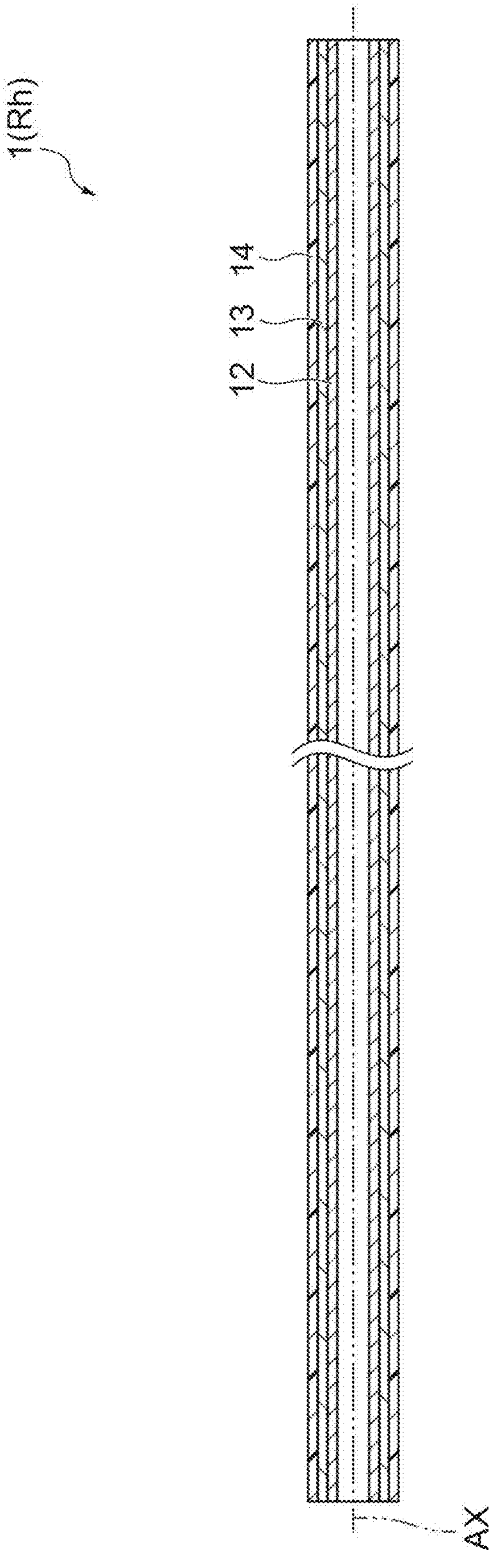
FIG. 1 is a cross-sectional view along a longitudinal direction of a hollow-core fiber of a first embodiment.

Problem to be Solved by the Disclosure

As a result of examining the above-mentioned conventional technology, the inventors discovered the following issues. That is, in the above-mentioned conventional technology, when an end of a hollow-core fiber is left open, the atmosphere and water can enter a hole from the open end. Invasion of water causes a loss increase in a wavelength range of 1.38 μm, and invasion of carbon dioxide ($CO_2$) in the atmosphere causes a loss increase in a 1.55 μm band. When dust enters together with the atmosphere, in particular, metal components such as metal particles react with halogen components from glass to form corrosive metal halides, exhibiting erosion properties, corrosive properties, etc. As a result, there is concern that stable use for a long period of time may be impossible due to deterioration over time.

To prevent various invasions from an open end of the hollow-core fiber, a method of connecting a conventional optical fiber to both ends of the hollow-core fiber and sealing the ends has been frequently used. However, Fresnel reflection occurs at an interface between a hollow portion of the hollow-core fiber and a solid portion of the conventional optical fiber. In addition, there is a large difference in mode field diameter between the hollow-core fiber and the conventional optical fiber. Connection loss caused by the difference in mode field diameter can be suppressed by TEC (Thermal Expansion Core) technology, but the effect is limited. For this reason, in sealing using the conventional optical fiber, connection loss occurs and characteristics of the hollow-core fiber cannot be fully utilized.

It is conceivable to solidify the ends of the hollow-core fiber. However, since a refractive index in a solidified portion is usually uniform, a central portion does not have a function of confining light. Therefore, there is concern that light may leak from the ends, so that light cannot propagate.

An objective of the disclosure is to provide a hollow-core fiber capable of propagating light while suppressing connection loss associated with sealing the ends due to connection of conventional optical fibers, and a method for manufacturing the hollow-core fiber.

Effect of the Disclosure

According to the hollow-core fiber of the disclosure, it is possible to propagate light while suppressing connection loss associated with sealing the ends due to connection of conventional optical fibers.

Description of Embodiments of the Disclosure

First, embodiments of the disclosure will be listed and described.

(1) A hollow-core fiber according to an aspect of the disclosure includes a hollow region that is a region extending in a longitudinal direction. The hollow region includes a glass structure constituting an optical transmission part provided with a hollow portion, and an outer cladding surrounding the glass structure. When a diameter of a circle having the same area as a total area of a cross section perpendicular to the longitudinal direction of the glass structure is set to 2a, an average refractive index of the glass structure is set to n1, an average refractive index of the outer cladding is set to n2, a wavelength of light propagating through the optical transmission part is set to λ, and a specific refractive index difference between the glass structure and the outer cladding is set to Δ shown in Equation (1), then n1>n2, and a normalized frequency v shown in Equation (2) is 2.56 or more.

[Formula 3]

$$\Delta = \frac{n1^2 - n2^2}{2n1^2} \tag{1}$$

[Formula 4]

$$v = \frac{2\pi}{\lambda} an1\sqrt{2\Delta} \tag{2}$$

In the hollow-core fiber, even when a part of the hollow region in the longitudinal direction is solidified, since the normalized frequency is within the above range, the solid region can properly relay light. Therefore, light can be propagated while suppressing the impact of breakage.

(2) The hollow-core fiber of (1) may be a hollow-core fiber further including a solid region that is a region extending in the longitudinal direction, wherein the solid region may include a core made of the same material as a material of the glass structure, and cladding made of the same material as a material of the outer cladding and configured to surround the core, an area of a cross section of the core perpendicular to the longitudinal direction may be the same as the total area of the glass structure, and an area of a cross section of the cladding perpendicular to the longitudinal direction may be the same as an area of a cross section of the outer cladding perpendicular to the longitudinal direction. In this case, since the solid region has a structure equivalent to a structure in which the hollow region is solidified, light can be propagated while suppressing the influence of breakage.

(3) In (2), a pair of the solid regions may be provided at both ends of the hollow region. In this case, invasion of atmosphere, water, etc. into the hollow region can be reliably suppressed.

(4) In (2) or (3), a pair of the hollow regions may be provided at both ends of the solid region. In this case, even when atmosphere, water, etc. invades one of the pair of hollow regions, an influence on the other hollow region can be suppressed.

(5) In any one of (2) to (4), the solid region may be provided at an end of the hollow-core fiber and may be connected to an optical fiber having a core and a cladding. In this case, connection with a so-called conventional optical fiber can be ensured at the end. In this way, connection with a connector, etc. can be ensured.

(6) In any one of (2) to (5), a plurality of the hollow regions and a plurality of the solid regions may be alternately provided. In this case, light can be propagated while suppressing the influence of breakage over a long distance.

(7) In any one of (2) to (6), two nearest solid regions are provided with the hollow region having a length from 3 km to 20 km interposed therebetween. In this case, since the length of the hollow region is 3 km or more, an increase in additional loss can be suppressed. Further, since the length of the hollow region is 20 km or less, it is possible to suppress weakening of an effect of solidification in limiting a region where properties are degraded upon breakage.

(8) In any one of (2) to (7), a length of the solid region may be 0.5 mm or more. In this case, the solid region can more appropriately transmit light.

(9) In any one of (2) to (8), the hollow region and the solid region may be coaxially provided.

(10) In any one of (2) to (9), the normalized frequency v may be 11.0 or less. In this case, loss per solid point obtained by solidifying the hollow-core fiber can be reduced to 0.3 dB or less.

(11) In any one of (2) to (9), the normalized frequency v may be 8.0 or less. In this case, loss per solid point obtained by solidifying the hollow-core fiber can be reduced to 0.25 dB or less.

(12) In any one of (2) to (9), the normalized frequency v may be 6.0 or less. In this case, loss per solid point obtained by solidifying the hollow-core fiber can be reduced to 0.20 dB or less.

(13) In any one of (2) to (12), an outer diameter of the solid region may be smaller than an outer diameter of the hollow region.

(14) In any one of (1) to (13), the glass structure may include a plurality of inner cladding elements.

(15) A method for manufacturing a hollow-core fiber according to an aspect of the disclosure includes a process of melting and solidifying a part of a glass fiber in a longitudinal direction by heating from a side, the glass fiber including a glass structure constituting an optical transmission part provided with a hollow portion, and an outer cladding surrounding the glass structure.

In the method for manufacturing the hollow-core fiber, the hollow-core fiber including the solid region can be easily manufactured.

Details of Embodiment of the Disclosure

Specific examples of the hollow-core fiber according to the present embodiment will be described with reference to the drawings as necessary. Note that the disclosure is not limited to these examples, is indicated by the claims, and is intended to include all modifications within the scope of the claims and meaning equivalent to the claims. In the description of the drawings, the same elements are given the same reference numerals, and duplicated descriptions will be omitted.

First Embodiment

Figure 2:
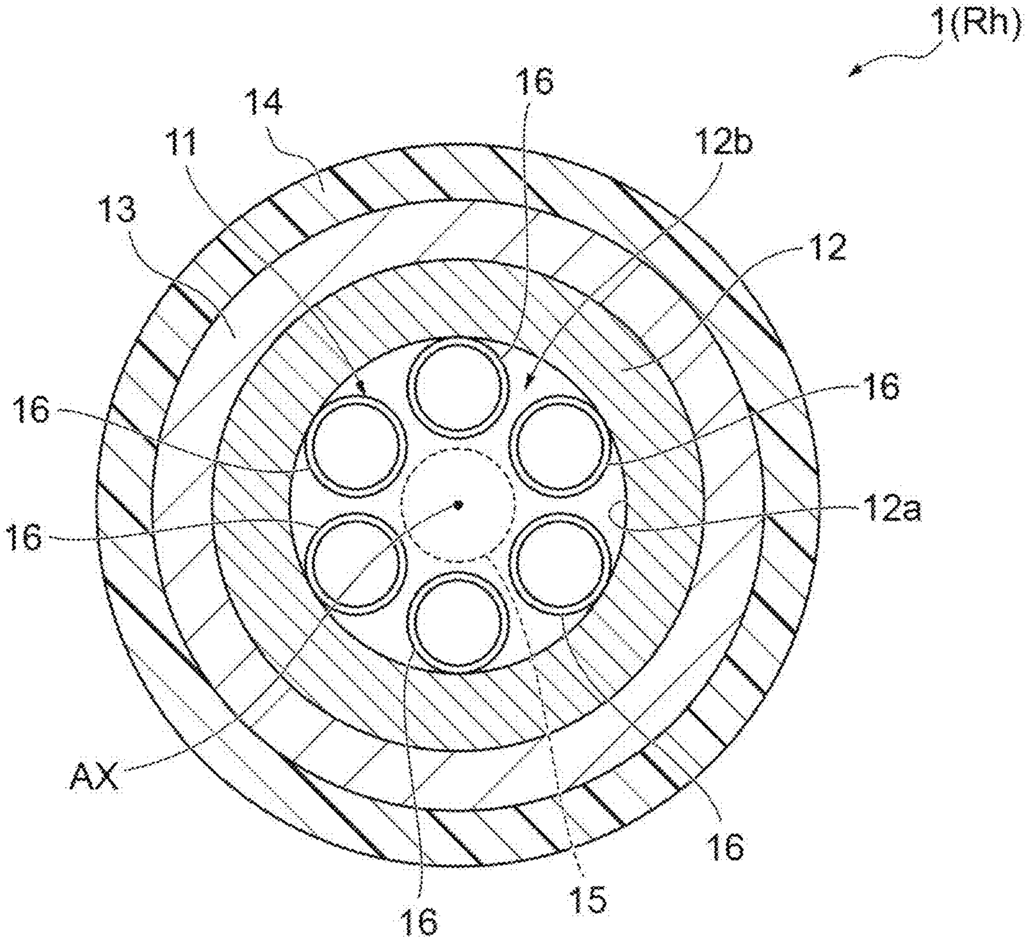
FIG. 2 is a cross-sectional view perpendicular to the longitudinal direction of the hollow-core fiber of FIG. 1.

FIG. 1 is a cross-sectional view along a longitudinal direction of a hollow-core fiber of a first embodiment. FIG. 2 is a cross-sectional view perpendicular to the longitudinal direction of the hollow-core fiber of FIG. 1. As illustrated in FIGS. 1 and 2, a hollow-core fiber 1 according to the first embodiment has a structure of an anti-resonant hollow-core fiber. The longitudinal direction of hollow-core fiber 1 is a direction along a central axis AX of hollow-core fiber 1. Hollow-core fiber 1 includes a hollow region Rh which is a region extending in the longitudinal direction. Hollow-core fiber 1 includes a hollow region Rh that extends throughout the entire region in the longitudinal direction. Hollow-core fiber 1 includes a glass structure 11, an outer cladding 12, a jacket layer 13, and a resin coating 14. Note that a structure of an inner region 12*b* is omitted in FIG. 1.

Glass structure 11 surrounds a space serving as a core region 15. Core region 15 functions as a hollow optical waveguiding region. Core region 15 extends along central axis AX. Glass structure 11 functions as an anti-resonance layer that confines light to a center. Glass structure 11 is a transmission line component constituting an optical transmission part in which the hollow portion is provided.

Glass structure 11 includes a plurality of first inner cladding elements 16. In the present embodiment, glass structure 11 includes six first inner cladding elements 16. Plurality of first inner cladding elements 16 is disposed to surround a space serving as core region 15, while being welded to an inner circumferential surface 12*a* of outer cladding 12 at one point. Plurality of first inner cladding elements 16 are disposed spaced apart from each other. Plurality of first inner cladding elements 16 are disposed spaced apart at equal intervals. First inner cladding elements 16 are thin-walled tubes each having a pipe shape extending along central axis AX. Central axes of first inner cladding elements 16 are disposed shifted from central axis AX.

Outer cladding 12 surrounds glass structure 11. Outer cladding 12 functions as optical cladding. Outer cladding 12 is a thin-walled tube having a pipe shape extending along central axis AX. A central axis of outer cladding 12 coincides with central axis AX. Inner circumferential surface 12*a* of outer cladding 12 defines inner region 12*b* that accommodates glass structure 11. A remaining portion of inner region 12*b*, excluding a portion occupied by plurality of first inner cladding elements 16, is a hollow portion of the optical transmission part. Inner region 12*b* corresponds to an optical transmission part in which the hollow portion is provided.

Jacket layer 13 surrounds outer cladding 12. Jacket layer 13 is in contact with an outer circumferential surface of outer cladding 12. Jacket layer 13 covers the outer circumferential surface of outer cladding 12. Jacket layer 13 functions as physical cladding. Resin coating 14 surrounds jacket layer 13. Resin coating 14 is in contact with an outer circumferential surface of jacket layer 13. Resin coating 14 covers the outer circumferential surface of jacket layer 13.

When a diameter of a circle having the same area as the total area of a cross section perpendicular to the longitudinal direction of glass structure 11 is set to 2a, an average refractive index of glass structure 11 is set to n1, and an average refractive index of outer cladding 12 is set to n2, then n1>n2. Furthermore, when a wavelength of light propagating through the optical transmission part is set to λ, and a specific refractive index difference between glass structure 11 and outer cladding 12 is set to Δ shown in Equation (1), a normalized frequency v shown in Equation (2) is from 2.56 to 11.0. Here, the total area of the cross section of glass structure 11 is the area of only a glass portion, not including the area of a spatial region between plurality of first inner cladding elements 16 and the area of a spatial region inside each of plurality of first inner cladding elements 16.

[Formula 5]

$$\Delta = \frac{n1^2 - n2^2}{2n1^2} \tag{1}$$

[Formula 6]

$$v = \frac{2\pi}{\lambda} an1\sqrt{2\Delta} \tag{2}$$

By setting normalized frequency v within this range, even when hollow-core fiber 1 is solidified by heating, etc., a structure in which signal light can propagate through a center thereof is formed. In this way, loss per solid point obtained by solidifying hollow-core fiber 1 can be reduced to 0.3 dB or less. Normalized frequency v may be from 2.56 to 8.0. In this case, loss per solid point can be reduced to 0.25 dB or less. Normalized frequency v may be from 2.56 to 6.0. In this case, loss per solid point can be reduced to 0.20 dB or less. Note that the wavelength is a communication wavelength at which hollow-core fiber 1 is intended to be used, that is, a wavelength of light propagated by hollow-core fiber 1, and is, for example, 1.55 μm.

Figure 3:
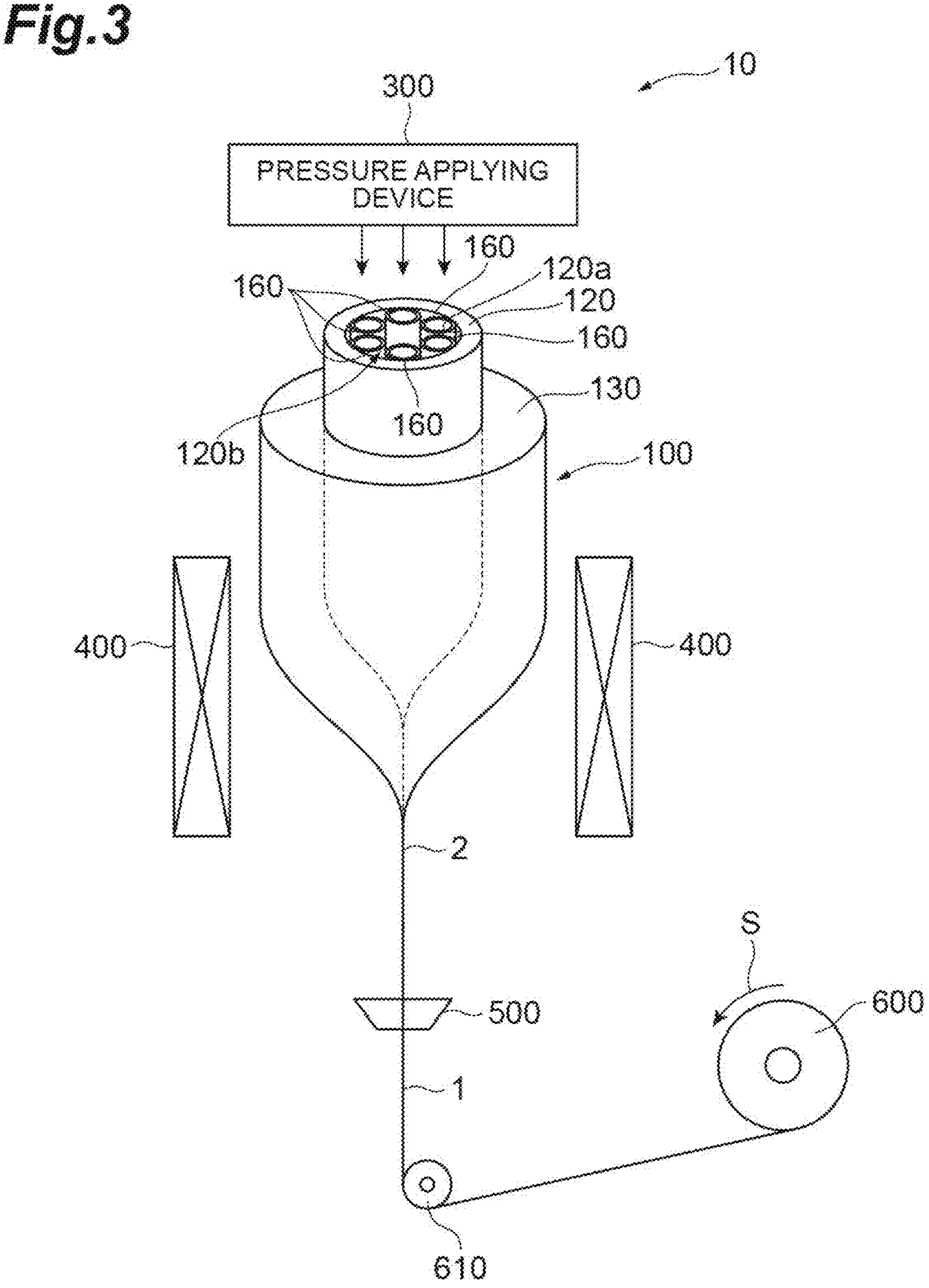
FIG. 3 is a diagram for describing a drawing step of a method for manufacturing the hollow-core fiber according to the first embodiment.

Next, a description will be given of a method for manufacturing hollow-core fiber 1. The method for manufacturing hollow-core fiber 1 includes a drawing step. FIG. 3 is a diagram for describing the drawing step of the method for manufacturing hollow-core fiber 1 according to the first embodiment.

A drawing apparatus 10 illustrated in FIG. 3 includes a pressure applying device 300, a heater 400, a resin applying device 500, a winding device 600, and a roller 610. Pressure applying device 300 applies pressure to the inside of an optical fiber preform 100 to be drawn. Heater 400 heats one end of optical fiber preform 100. Resin applying device 500 applies resin to a surface of a drawn glass fiber 2 to form hollow-core fiber 1. Winding device 600 winds up hollow-core fiber 1. Roller 610 adjusts a traveling direction of hollow-core fiber 1.

Optical fiber preform 100 includes an outer cladding portion 120 having a pipe shape and becoming outer cladding 12 after drawing, a plurality of first inner cladding element portions 160 having pipe shapes and becoming first inner cladding elements 16 after drawing, and a jacket portion 130 becoming jacket layer 13 after drawing. In an inner region 120*b* surrounded by an inner circumferential surface 120*a* of outer cladding portion 120, each of plurality of first inner cladding element portions 160 is disposed to surround a center of outer cladding portion 120 while being in contact with inner circumferential surface 120*a*. In addition, jacket portion 130 is provided on an outer circumference of outer cladding portion 120.

One end of optical fiber preform 100 is softened by heating using heater 400. When a drum of winding device 600 rotates in a direction indicated by an arrow S, hollow glass fiber 2 is drawn out from the one end of optical fiber preform 100. In this instance, pressure control gas or air is supplied to an internal space of outer cladding portion 120 and an internal space of each of plurality of first inner cladding element portions 160 by pressure applying device 300, and these internal spaces are in a pressurized state so as not to deform the pipe shape. Glass fiber 2 has a glass structure surrounding a space serving as core region 15 and corresponding to glass structure 11, and outer cladding surrounding the glass structure and corresponding to outer cladding 12.

A resin is applied by resin applying device 500 to a surface of glass fiber 2 drawn out from optical fiber preform 100, and hollow-core fiber 1 is obtained. Obtained hollow-core fiber 1 is finally wound around the drum of winding device 600 via roller 610.

Second Embodiment

Figure 4:
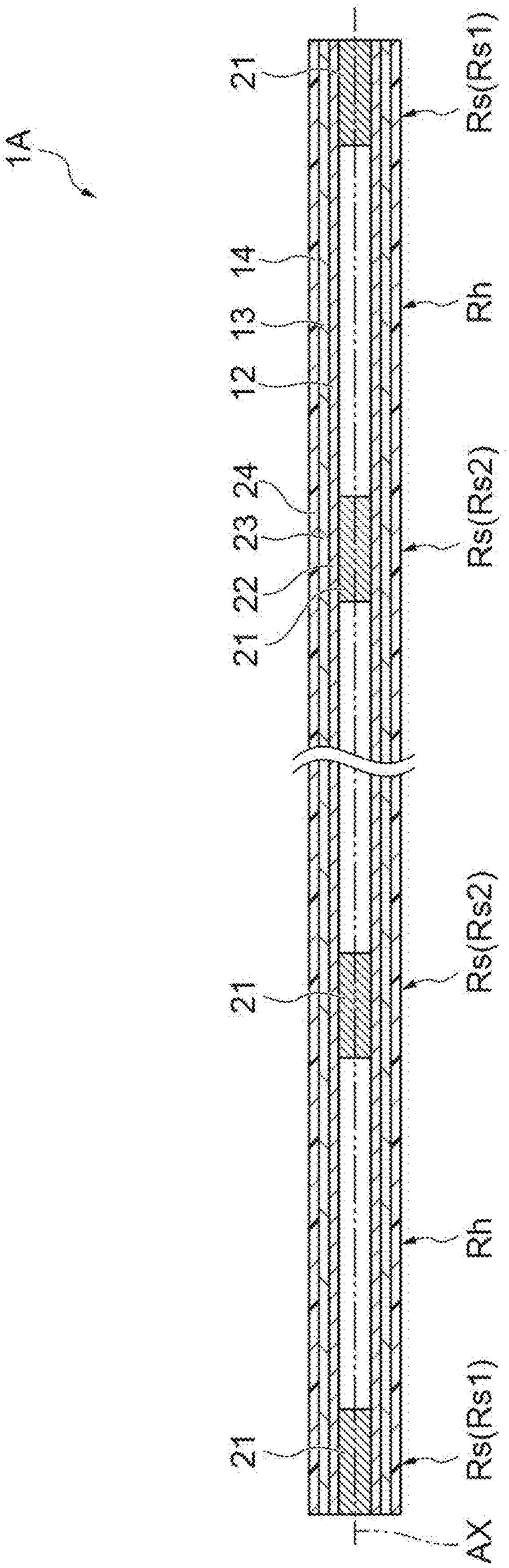
FIG. 4 is a cross-sectional view along a longitudinal direction of a hollow-core fiber according to a second embodiment.

FIG. 4 is a cross-sectional view along a longitudinal direction of a hollow-core fiber according to a second embodiment. As illustrated in FIG. 4, a hollow-core fiber 1A according to the second embodiment differs from hollow-core fiber 1 in that a solid region Rs that is a region extending in the longitudinal direction is further included in addition to a hollow region Rh that is a region extending in the longitudinal direction. Hollow region Rh has the same configuration as that of hollow region Rh of hollow-core fiber 1. Hollow region Rh and solid region Rs are coaxially provided. Note that in FIG. 4, a structure of inner region 12*b* (see FIG. 2) of hollow region Rh is omitted.

Figure 5:
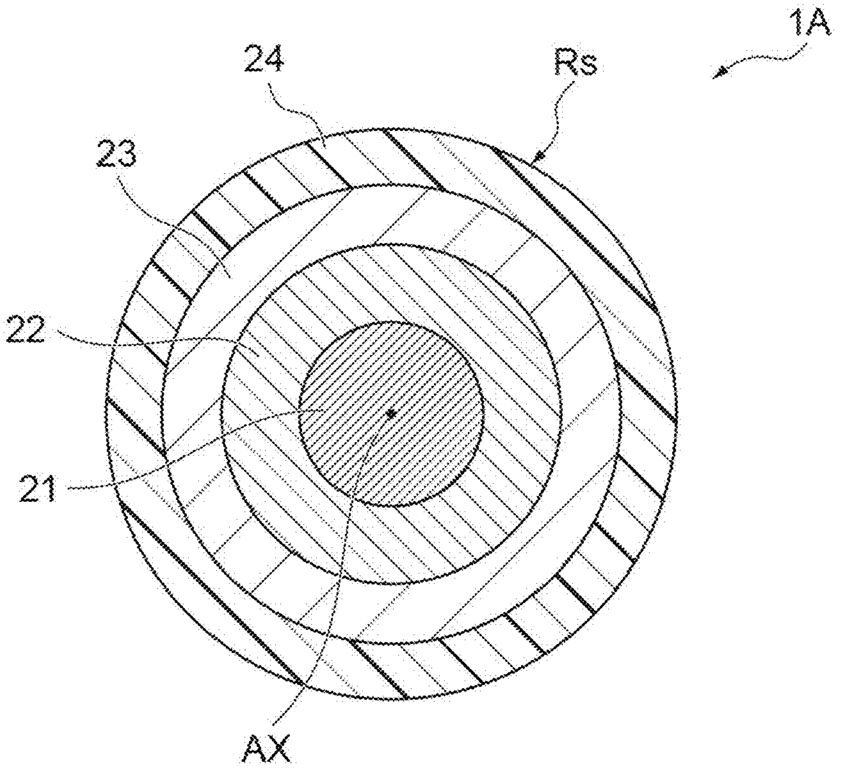
FIG. 5 is a cross-sectional view of a solid region.

FIG. 5 is a cross-sectional view of solid region Rs. As illustrated in FIG. 5, solid region Rs includes a core 21, cladding 22, a jacket layer 23, and a resin coating 24. A central axis of core 21 coincides with central axis AX. Core 21 is made of the same material as the material of glass structure 11. Core 21 is a solid body having no hollow portion. In core 21, a glass structure corresponding to glass structure 11 is melted by heating and solidified. The area of a cross section perpendicular to a longitudinal direction of core 21 is the same as the total area of a cross section perpendicular to the longitudinal direction of glass structure 11. Here, "the same" includes a case where values are different within an error range of about ±5%.

The cross-sectional area of core 21 can be obtained, for example, from a refractive index profile. That is, when a boundary between core 21 and cladding 22 is determined as a position where a gradient of the refractive index is maximum, and then a diameter of core 21 is obtained based on this boundary, the cross-sectional area of core 21 can be obtained. For example, the total cross-sectional area of glass structure 11 can be obtained by image analysis of a cross section of hollow region Rh, or can be obtained from a refractive index profile after hollow region Rh is solidified by heating.

Cladding 22 surrounds core 21. Cladding 22 is in contact with an outer circumferential surface of core 21. Cladding 22 covers the outer circumferential surface of core 21. Cladding 22 functions as optical cladding. Cladding 22 is made of the same material as that of outer cladding 12. The area of a cross section perpendicular to a longitudinal direction of cladding 22 is the same as the area of a cross section perpendicular to a longitudinal direction of outer cladding 12. Here, "the same" includes a case where values are different within an error range of about ±5%.

Jacket layer 23 surrounds cladding 22. Jacket layer 23 is in contact with an outer circumferential surface of cladding 22. Jacket layer 23 covers the outer circumferential surface of the cladding 22. Jacket layer 23 functions as physical cladding. Jacket layer 23 is made of the same material as that of jacket layer 13. Resin coating 24 surrounds jacket layer 23. Resin coating 24 is in contact with an outer circumferential surface of jacket layer 23. Resin coating 24 covers the outer circumferential surface of jacket layer 23. Resin coating 24 is made of the same material as that of resin coating 14.

Since hollow region Rh includes a hollow portion, an outer diameter of solid region Rs is smaller than an outer diameter of hollow region Rh. In FIG. 4, the outer diameter of hollow region Rh and the outer diameter of solid region Rs are illustrated as being equal for simplicity.

According to a structure of solid region Rs, a deviation between a mode field diameter (hereinafter, MFD) of hollow region Rh and an MFD of solid region Rs is suppressed at a certain level or less, so that increased loss due to MFD mismatch is suppressed. When glass structure 11 is solidified, hollow region Rh has substantially the same configuration as that of solid region Rs.

In the present embodiment, hollow-core fiber 1A includes a plurality of hollow regions Rh and a plurality of solid regions Rs. Hollow regions Rh and solid regions Rs are alternately connected along the longitudinal direction. Solid regions Rs are provided at intervals from 3 km to 20 km along the longitudinal direction of hollow-core fiber 1A. When the intervals are too short, additional loss increases. When the intervals are excessively long, an effect of solidification in limiting a region where characteristics are degraded upon breakage is weakened.

An interval between a pair of adjacent solid regions Rs with hollow region Rh interposed therebetween may be considered to be from 3 km to 20 km. Two nearest solid regions Rs may also be considered to be provided with hollow region Rh having a length from 3 km to 20 km interposed therebetween. In other words, a longitudinal length of one hollow region Rh is from 3 km to 20 km. A longitudinal length of solid region Rs is 0.5 mm or more.

Plurality of solid regions Rs includes a pair of solid regions Rs1 and one or a plurality of solid regions Rs2. Pair of solid regions Rs1 is provided at both ends of hollow-core fiber 1A. Hollow region Rh is provided at one end of each of solid regions Rs1. For example, an optical fiber having a core and a cladding (so-called conventional optical fiber) is connected to the other end of solid region Rs1. Solid regions Rs (solid regions Rs1 or solid regions Rs2) are provided at both ends of each hollow region Rh. Hollow regions Rh are provided at both ends of solid region Rs2. Solid region Rs2 is provided between a pair of hollow regions Rh. Note that hollow-core fiber 1A only needs to include at least hollow region Rh and solid region Rs, and the number of hollow regions Rh and the number of solid regions Rs are not limited. Hollow-core fiber 1A may include, for example, one hollow region Rh and a pair of solid regions Rs1 provided at both ends of hollow region Rh.

Figure 6:
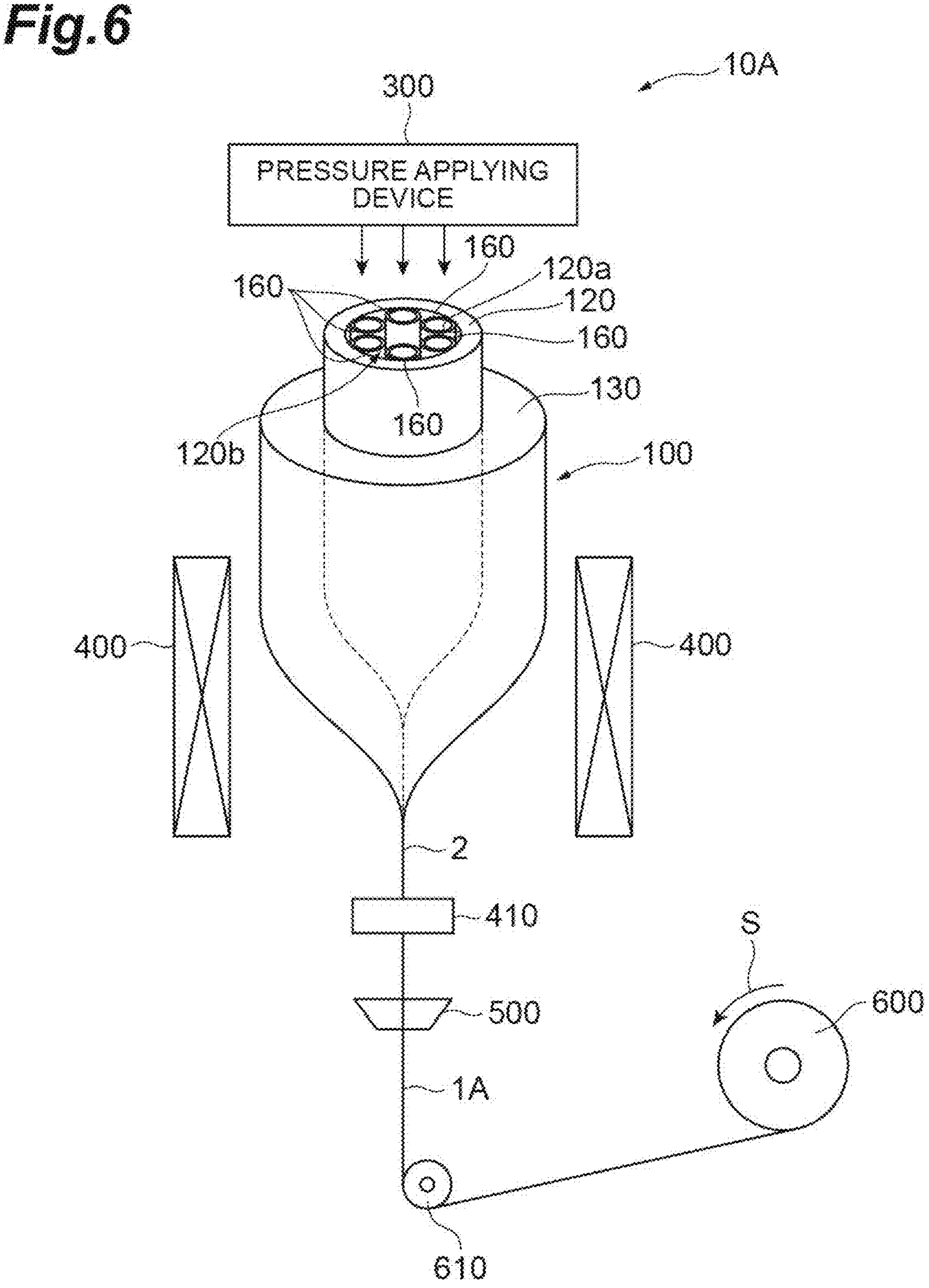
FIG. 6 is a diagram for describing a drawing process including a solidification process.

Next, a method for manufacturing hollow-core fiber 1A will be described. The method for manufacturing hollow-core fiber 1A differs from the method for manufacturing hollow-core fiber 1 in that a drawing process includes a solidification process. FIG. 6 is a diagram for describing the drawing process including the solidification process.

A drawing apparatus 10A illustrated in FIG. 6 is different from drawing apparatus 10 illustrated in FIG. 3 in that a heat melting device 410 is included. Heat melting device 410 heats a part of hollow glass fiber 2 drawn from optical fiber preform 100 in the longitudinal direction from the side to solidify the part. Heat melting device 410 can form an intermittently solidified region in the longitudinal direction of glass fiber 2. For example, heat melting device 410 heats and melts glass fiber 2 by radiating a $CO_2$ laser. An interval and length of solid region Rs can be adjusted by adjusting a radiation pattern of the $CO_2$ laser. Heat melting device 410 may heat and melt glass fiber 2 by, for example, radiation of a microwave or arc discharge instead of radiating the $CO_2$ laser.

As described above, hollow glass fiber 2 is drawn from one end of optical fiber preform 100 softened by heating. The solidification process is performed on a part of drawn glass fiber 2 in the longitudinal direction. In the solidification process, the part of glass fiber 2 in the longitudinal direction is melted and solidified by being heated from the side by heat melting device 410. The solidification process is performed by controlling heat melting device 410 so that solidified regions have a predetermined length and are disposed at intervals from 3 km to 20 km. As described above, resin is applied by resin applying device 500 to a surface of glass fiber 2 whose part in the longitudinal direction has been solidified, and hollow-core fiber 1A is obtained. Obtained hollow-core fiber 1A is finally wound on the drum of winding device 600 via roller 610.

Since hollow-core fiber 1A has solid region Rs, even when a break occurs in a part in the longitudinal direction and water, $CO_2$, or fine dust enters hollow region Rh from the broken part, an influence on other hollow regions Rh is suppressed. Therefore, when only hollow region Rh including the broken part is discarded, the rest can be used as a product. In the case of hollow-core fiber 1A that has already been laid and used, only hollow region Rh including the broken part may be replaced with new hollow-core fiber 1A.

Figure 7:
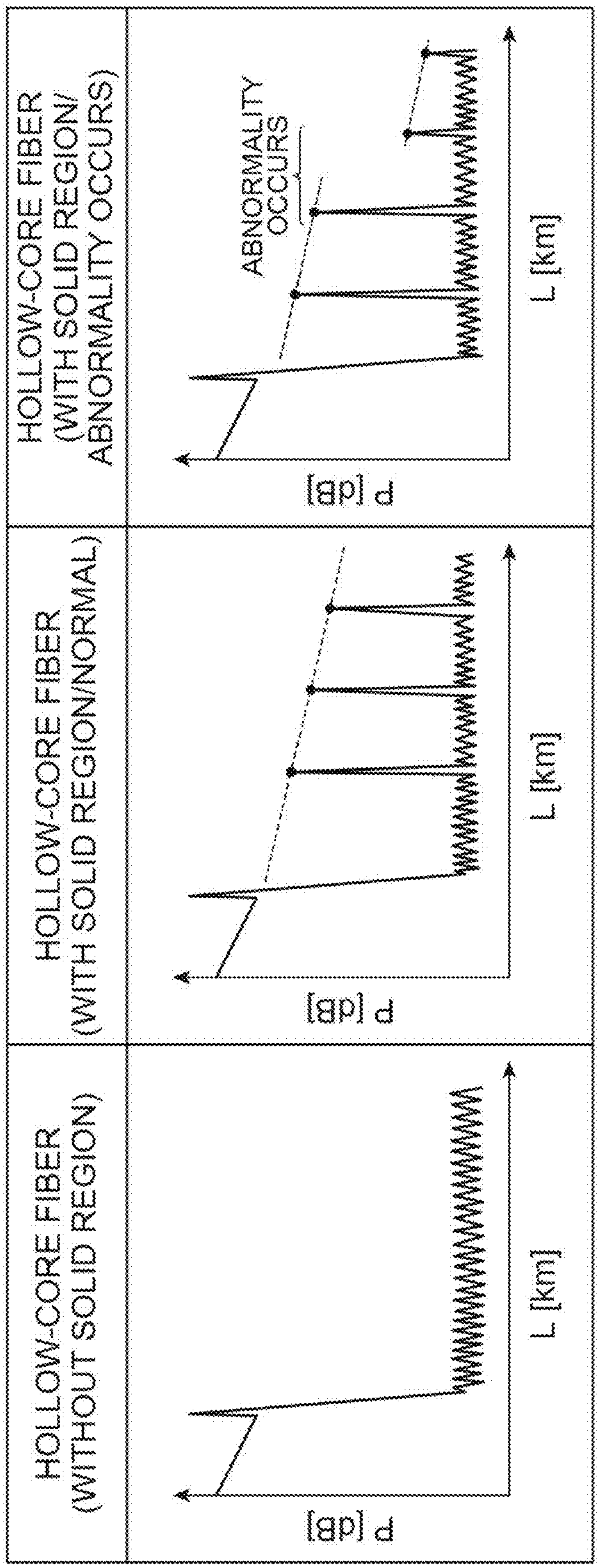
FIG. 7 is a diagram for describing a method for detecting a defect location by OTDR measurement.

FIG. 7 is a diagram for describing a method for identifying an abnormality occurrence location in the hollow-core fiber. As illustrated in FIG. 7, in the case of a hollow-core fiber without a solid region, light intensity P detected by an OTDR (Optical Time Domain Reflectometer) is approximately constant regardless of a distance L from one end of the hollow-core fiber. In the case of a hollow-core fiber with a solid region, the light intensity P of a hollow region is also approximately constant regardless of the distance L. The light intensity P of the solid region linearly decreases as the distance L increases. When an abnormality occurs, the light intensity P of the solid region significantly changes before and after the abnormality occurrence location. In this way, it is possible to identify a region where an abnormality occurred.

Third Embodiment

Figure 8:
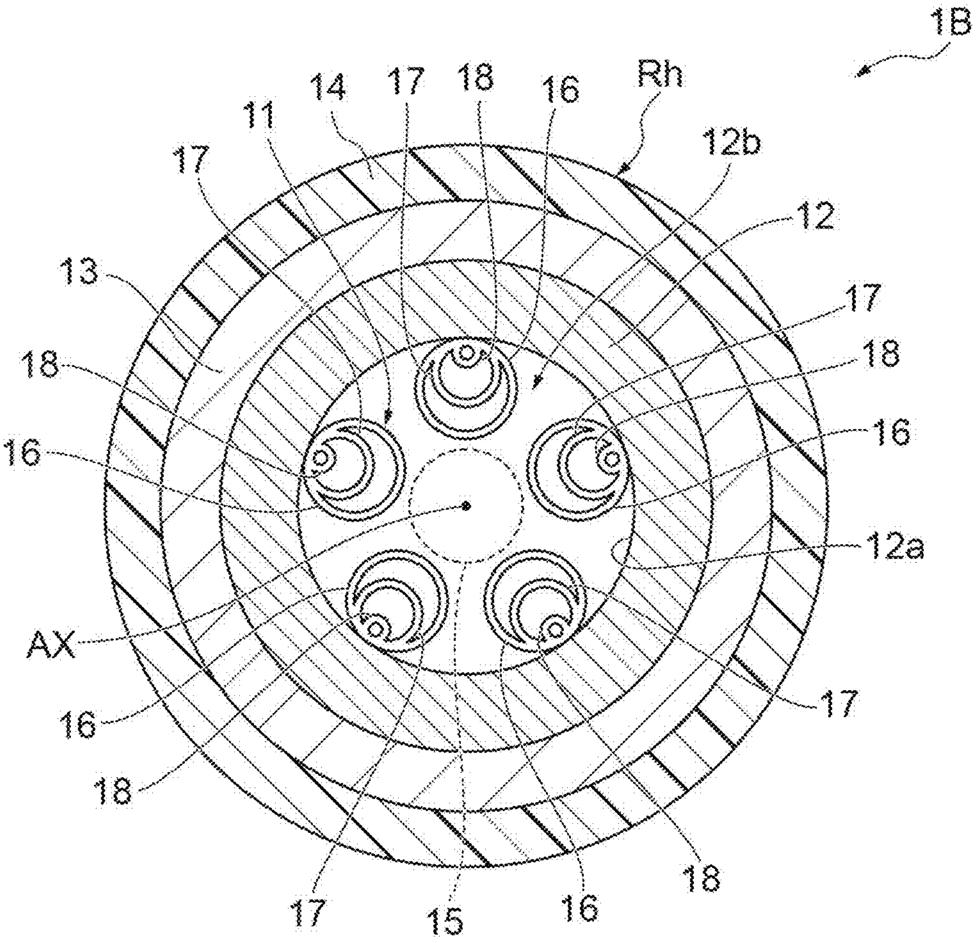
FIG. 8 is a cross-sectional view of a hollow region of a hollow-core fiber according to a third embodiment.

FIG. 8 is a cross-sectional view of a hollow region of a hollow-core fiber according to a third embodiment. As illustrated in FIG. 8, a hollow-core fiber 1B according to the third embodiment differs from hollow-core fiber 1 according to the first embodiment and hollow-core fiber 1A according to the second embodiment in that glass structure 11 has a plurality of second inner cladding elements 17 and a plurality of third inner cladding elements 18. Although illustration is omitted, when hollow-core fiber 1B has solid region Rs, solid region Rs of hollow-core fiber 1B has the same structure as that of solid region Rs of hollow-core fiber 1A. In the present embodiment, glass structure 11 includes five first inner cladding elements 16, five second inner cladding elements 17, and five third inner cladding elements 18.

Second inner cladding elements 17 are thin-walled tubes each having a pipe shape extending along central axis AX. Second inner cladding elements 17 are disposed one by one inside first inner cladding elements 16. The number of second inner cladding elements 17 is the same as the number of first inner cladding elements 16. Second inner cladding elements 17 are made of, for example, the same material (glass material) as a material of first inner cladding elements 16.

Third inner cladding elements 18 are thin-walled tubes each having a pipe shape extending along central axis AX. Third inner cladding elements 18 are disposed one by one inside second inner cladding elements 17. The number of third inner cladding elements 18 is the same as the number of second inner cladding elements 17. Third inner cladding elements 18 are made of, for example, the same material (glass material) as the material of first inner cladding elements 16.

Second inner cladding elements 17 and third inner cladding elements 18 are disposed while being welded to welded portions between first inner cladding elements 16 and outer cladding 12. In other words, first inner cladding elements 16, second inner cladding elements 17, and third inner cladding elements 18 are disposed while being welded to a common point on inner circumferential surface 12*a* of outer cladding 12. Dimensions of second inner cladding elements 17 and third inner cladding elements 18 such as diameters and thicknesses are designed to enable light in a communication wavelength band to propagate with relatively low loss.

Hereinafter, experimental examples will be described. Note that the disclosure is not limited to examples.

Example 1

As Example 1, a hollow-core fiber having a configuration corresponding to hollow-core fiber 1B according to the third embodiment was manufactured. Specifically, a hollow-core fiber including only a hollow region was manufactured similarly to the method for manufacturing hollow-core fiber 1 according to the first embodiment. Then, a $CO_2$ laser was applied to an end of the obtained hollow-core fiber to form a solid region. A length of the solid region was set to 10 mm. An outer diameter of outer cladding was set to 150 μm, an inner diameter of outer cladding was set to 79.7 μm, a diameter of the first inner cladding elements was set to 28.1 μm, a thickness of the first inner cladding elements was set to 0.5 μm, a diameter of the second inner cladding elements was set to 22.6 μm, a thickness of the second inner cladding elements was set to 0.5 μm, a diameter of the third inner cladding elements was set to 7.6 μm, and a thickness of the third inner cladding elements was set to 0.5 μm. The total area of a cross section perpendicular to the longitudinal direction of the glass structure was 458.6 $\mu m^2$, and a diameter of a circle having the same area was 24.2 μm.

Figure 9:
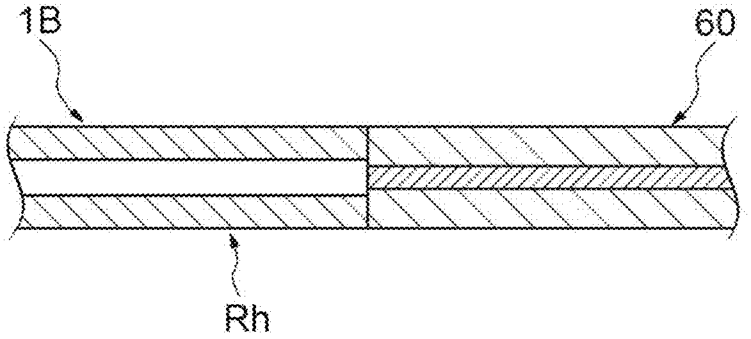
FIG. 9 is a cross-sectional view illustrating a connection portion between a hollow region and a conventional optical fiber.
Figure 10:
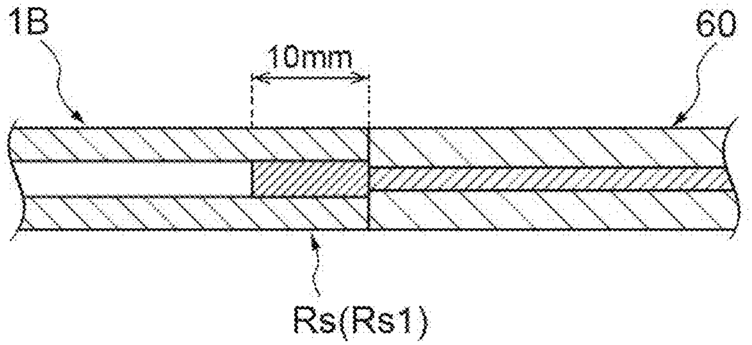
FIG. 10 is a cross-sectional view illustrating a connection portion between a solid region and the conventional optical fiber.

FIG. 9 is a cross-sectional view illustrating a connection portion between a hollow region and a conventional optical fiber. As illustrated in FIG. 9, an end of hollow-core fiber 1B of Example 1 before being solidified was directly connected to conventional optical fiber 60 by fusion. FIG. 10 is a cross-sectional view illustrating a connection portion between a solid region and the conventional optical fiber. As illustrated in FIG. 10, the end of hollow-core fiber 1B of Example 1 before being solidified was directly connected to conventional optical fiber 60 by fusion. For reference, in FIGS. 9 and 10, for hollow-core fiber 1B, the same reference numerals as those in the third embodiment are indicated. Furthermore, in FIGS. 9 and 10, a structure of the inner region of hollow-core fiber 1B is omitted, and the outer cladding, jacket, and resin coating are simply illustrated as one layer.

The MFD of hollow region Rh of hollow-core fiber 1B was 25.0 μm at a wavelength of 1550 nm, and the MFD of conventional optical fiber 60 was 10.0 μm at a wavelength of 1550 mm. In the case of FIG. 9, loss for one connection portion was 0.6 dB on average. In the case of FIG. 10, loss for one connection portion was changed by a v-value of Equation (2). The v-value was changed by adjusting a specific refractive index difference Δ between the glass structure and the outer cladding.

Table 1 illustrates the specific refractive index difference Δ [%], the v-value, and the loss [dB] for one connection portion in the case of FIG. 10.

TABLE 1

| Δ [%] | v-value | Loss/connection portion [dB] |
|---|---|---|
| 1.501 | 12.35 | 0.36 |
| 1.166 | 10.84 | 0.36 |
| 0.963 | 9.83 | 0.37 |
| 0.759 | 8.71 | 0.37 |
| 0.552 | 7.43 | 0.37 |
| 0.346 | 5.88 | 0.39 |
| 0.277 | 5.26 | 0.40 |
| 0.208 | 4.56 | 0.42 |
| 0.138 | 3.72 | 0.46 |
| 0.069 | 2.63 | 0.58 |
| 0.035 | 1.86 | 0.81 |

Figure 11:
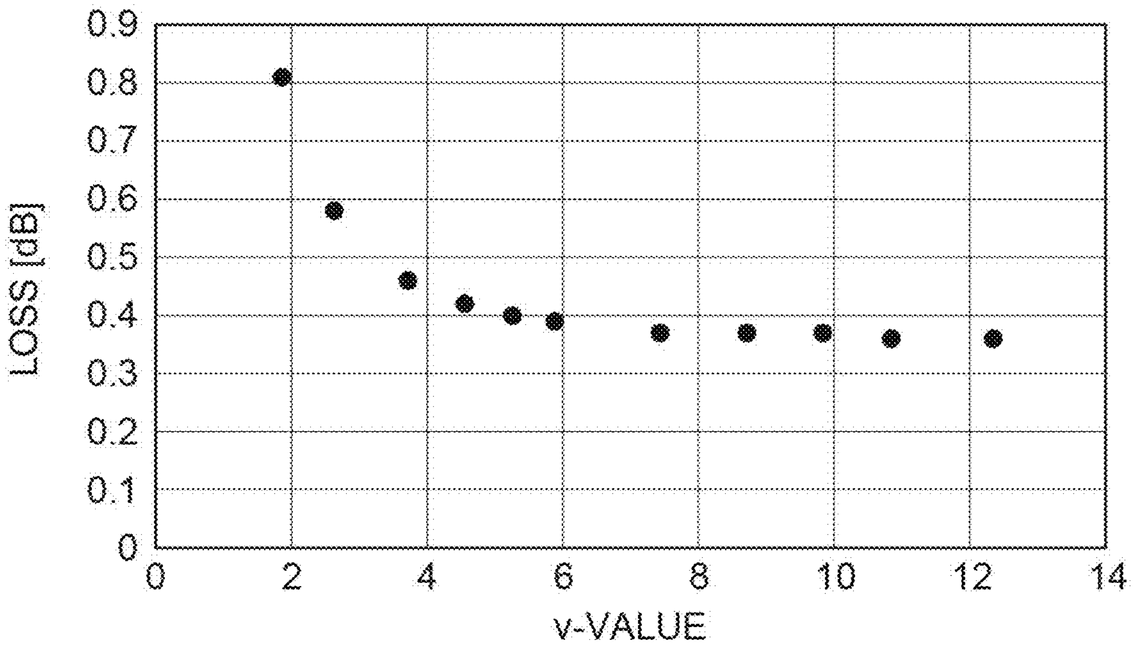
FIG. 11 is a graph illustrating a relationship between a v-value and loss for one connection portion.

FIG. 11 is a graph illustrating a relationship between a v-value and loss for one connection portion. A horizontal axis of FIG. 11 represents a v-value of hollow-core fiber 1B of Example 1. A vertical axis of FIG. 11 represents loss [dB] for one connection portion in the case of FIG. 10. An approximation curve was calculated for the graph of FIG. 11, and a v-value at which the approximation curve became 0.6 dB was calculated. As a result, it could be confirmed that, when the v-value is 2.56 or more, the loss for one connection portion can be made smaller than 0.6 dB.

Example 2

As Example 2, a hollow-core fiber having a configuration corresponding to hollow-core fiber 1B according to the third embodiment was manufactured. Specifically, similarly to the method for manufacturing hollow-core fiber 1A according to the second embodiment, a $CO_2$ laser was applied at an interval of 5 km during drawing, and a hollow-core fiber having a length of 50 km was manufactured. A length of a solid region was set to 10 mm. Outer and inner diameters of outer cladding, diameters and thicknesses of first inner cladding elements, diameters and thicknesses of second inner cladding elements, diameters and thicknesses of third inner cladding elements, and the total area of a cross section perpendicular to a longitudinal direction of a glass structure was set to be the same as that of the hollow-core fiber according to Example 1. Loss for one solid region (solid point) was changed by the v-value of Equation (2). The v-value was changed by adjusting a specific refractive index difference Δ between the glass structure and the outer cladding.

Table 2 illustrates the specific refractive index difference Δ [%], the v-value, and the loss [dB] for one solid region.

TABLE 2

| Δ [%] | v-value | Loss/solid region [dB] |
|---|---|---|
| 1.501 | 12.35 | 0.32 |
| 1.166 | 10.84 | 0.30 |
| 0.963 | 9.83 | 0.28 |
| 0.759 | 8.71 | 0.26 |
| 0.552 | 7.43 | 0.24 |
| 0.346 | 5.88 | 0.18 |
| 0.277 | 5.26 | 0.16 |
| 0.208 | 4.56 | 0.12 |
| 0.138 | 3.72 | 0.06 |
| 0.069 | 2.63 | 0.00 |
| 0.035 | 1.86 | 0.14 |

Figure 12:
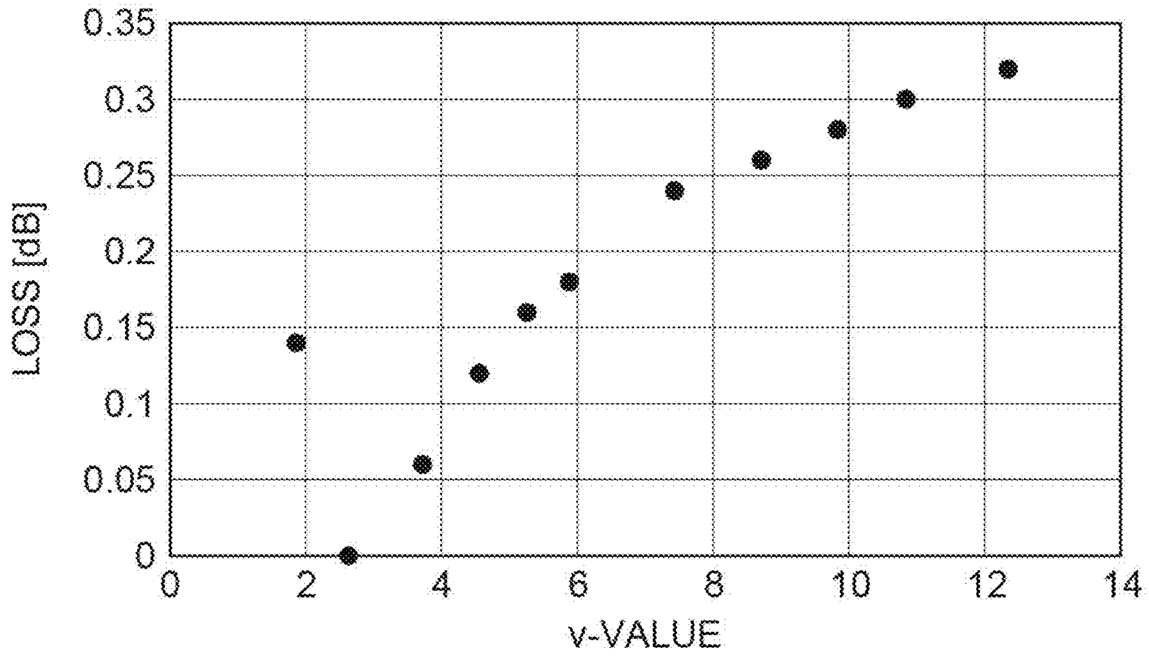
FIG. 12 is a graph illustrating a relationship between a v-value and loss for one solid region.

FIG. 12 is a graph illustrating a relationship between a v-value and loss for one solid region. A horizontal axis of FIG. 12 represents the v-value of the hollow-core fiber of Example 2. A vertical axis of FIG. 12 represents the loss (loss per solid point) [dB] for one solid region. According to FIG. 12, it could be confirmed that, when the v-value is 11 or less, the loss is suppressed to 0.30 dB or less, when the v-value is 8.0 or less, the loss is suppressed to 0.25 dB or less, and when the v-value is 6.0 or less, the loss is suppressed to 0.20 dB or less.

Even though the embodiments have been described above, the disclosure is not necessarily limited to the above-described embodiments, and various modifications are possible without departing from the scope of the disclosure. The above-described embodiments may be combined as appropriate.

In the method for manufacturing hollow-core fiber 1A according to the second embodiment, a portion of hollow glass fiber 2 in the longitudinal direction drawn out from optical fiber preform 100 is solidified by heat melting device 410. However, glass fibers 2 may be fused to each other to form solid region Rs at a fusion point.

It is sufficient that hollow region Rh includes glass structure 11 constituting an optical transmission part provided with a hollow portion and outer cladding 12, and a configuration other than that of the above embodiments may be adopted. Hollow region Rh may be a photonic crystal hollow-core fiber.

REFERENCE SIGNS LIST

1, 1A, 1B: hollow-core fiber, 2: glass fiber, 10, 10A: drawing apparatus, 11: glass structure, 12: outer cladding, 12*a*: inner circumferential surface, 12*b*: inner region, 13: jacket layer, 14: resin coating, 15: core region, 16: first inner cladding element, 17: second inner cladding element, 18: third inner cladding element, 21: core, 22: cladding, 23: jacket layer, 24: resin coating, 60: conventional optical fiber, 100: optical fiber preform, 120: outer cladding portion, 120*a*: inner circumferential surface, 120*b*: inner region, 130: jacket portion, 160: first inner cladding element portion, 300: pressure applying device, 400: heater, 410: heat melting device, 500: resin applying device, 600: winding device, 610: roller, AX: central axis, L: distance, P: light intensity, Rh: hollow region, Rs, Rs1, Rs2: solid region, S: arrow.

What is claimed is:

1. A hollow-core fiber comprising a hollow region that is a region extending in a longitudinal direction, wherein:

the hollow region includes a glass structure constituting an optical transmission part provided with a hollow portion, and an outer cladding surrounding the glass structure, and when a diameter of a circle having the same area as a total area of a cross section perpendicular to the longitudinal direction of the glass structure is set to 2a, an average refractive index of the glass structure is set to n1, an average refractive index of the outer cladding is set to n2, a wavelength of light propagating through the optical transmission part is set to λ, and a specific refractive index difference between the glass structure and the outer cladding is set to Δ shown in Equation (1), then n1>n2, and a normalized frequency v shown in Equation (2) is 2.56 or more.

[Formula 1]

$$\Delta = \frac{n1^2 - n2^2}{2n1^2} \quad (1)$$

[Formula 2]

$$v = \frac{2\pi}{\lambda} an1\sqrt{2\Delta}. \quad (2)$$

2. The hollow-core fiber according to claim 1, further comprising a solid region that is a region extending in the longitudinal direction, wherein:

the solid region includes a core made of the same material as a material of the glass structure, and a cladding made of the same material as a material of the outer cladding and configured to surround the core, an area of a cross section of the core perpendicular to the longitudinal direction is the same as the total area of the glass structure, and an area of a cross section of the cladding perpendicular to the longitudinal direction is the same as an area of a cross section of the outer cladding perpendicular to the longitudinal direction.

3. The hollow-core fiber according to claim 2, wherein a pair of solid regions including the solid region is provided at both ends of the hollow region.

4. The hollow-core fiber according to claim 2, wherein a pair of hollow regions including the hollow region is provided at both ends of the solid region.

5. The hollow-core fiber according to claim 2, wherein the solid region is provided at an end of the hollow-core fiber and is connected to an optical fiber having a core and a cladding.

6. The hollow-core fiber according to claim 2, wherein a plurality of the hollow regions including the hollow region and a plurality of solid regions including the solid region are alternately provided.

7. The hollow-core fiber according to claim 2, wherein two nearest solid regions are provided with the hollow region having a length from 3 km to 20 km interposed therebetween.

8. The hollow-core fiber according to claim 2, wherein a length of the solid region is 0.5 mm or more.

9. The hollow-core fiber according to claim 2, wherein the hollow region and the solid region are coaxially provided.

10. The hollow-core fiber according to claim 2, wherein the normalized frequency vis 11.0 or less.

11. The hollow-core fiber according to claim 2, wherein the normalized frequency vis 8.0 or less.

12. The hollow-core fiber according to claim 2, wherein the normalized frequency v is 6.0 or less.

13. The hollow-core fiber according to claim 2, wherein an outer diameter of the solid region is smaller than an outer diameter of the hollow region.

14. A method for manufacturing the hollow-core fiber according to claim 2, the method comprising a process of melting and solidifying a part of a glass fiber in the longitudinal direction by heating from a side, the glass fiber including the glass structure constituting an optical transmission part provided with a hollow portion, and the outer cladding surrounding the glass structure.

15. The hollow-core fiber according to claim 1, wherein the glass structure includes a plurality of inner cladding elements.

* * * * *